United States Patent
Ito (10) Patent No.: US 6,243,675 B1
(45) Date of Patent: Jun. 5, 2001

(54) SYSTEM AND METHOD CAPABLE OF AUTOMATICALLY SWITCHING INFORMATION OUTPUT FORMAT

(75) Inventor: Takenori Ito, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/634,759

(22) Filed: Aug. 8, 2000

(30) Foreign Application Priority Data

Sep. 16, 1999 (JP) .................................................. 11-262301

(51) Int. Cl.[7] ........................... G10L 15/08; G10L 13/02; G10L 15/26; G06F 17/27
(52) U.S. Cl. ........................ 704/232; 704/231; 704/270; 704/8; 704/275; 704/235
(58) Field of Search .................................. 704/231–235, 704/236, 254, 270–275, 8

(56) References Cited

U.S. PATENT DOCUMENTS

| | | | |
|---|---|---|---|
| 4,884,972 | * 12/1989 | Gasper | 704/276 |
| 5,758,023 | 5/1998 | Bordeaux . | |
| 5,855,000 | * 12/1998 | Waibel et al. | 704/235 |
| 5,890,122 | * 3/1999 | Van Kleeck et al. | 704/235 |

FOREIGN PATENT DOCUMENTS

| | | | |
|---|---|---|---|
| 936 597 | 8/1999 | (EP) | G10L/3/00 |
| 57-20043 | 2/1982 | (JP) | G06F/3/16 |
| 1-138594 | 5/1989 | (JP) | G10L/3/00 |
| 4-102014 | 4/1992 | (JP) | G01C/21/00 |
| 7-20894 | 1/1995 | (JP) | G10L/5/04 |
| 8-193837 | 7/1996 | (JP) | G01C/21/00 |
| 10-143191 | 5/1998 | (JP) | G10L/3/00 |
| 11-112665 | 4/1999 | (JP) | H04N/3/42 |

* cited by examiner

Primary Examiner—Richemond Dorvil
Assistant Examiner—Daniel A. Nolan
(74) Attorney, Agent, or Firm—Law Office of David G. Posz (57) ABSTRACT

In an information processing system such as a navigation system or a portable information terminal unit, information output mode of a display unit to a user is switchable to a plurality of output modes. The navigation system switches the language to be used for information output to any one of Japanese language, English language, and German language. Not the input speech itself is used as a command, but whether the input speech is a Japanese language input, an English language input, or a German language input is determined. The language to be used for information output is switched depending on the determination result.

16 Claims, 7 Drawing Sheets

SYSTEM AND METHOD CAPABLE OF AUTOMATICALLY SWITCHING INFORMATION OUTPUT FORMAT

CROSS REFERENCE TO RELATED APPLICATION

This application relates to and incorporates herein by reference Japanese Patent Application No. 11-262301 filed on Sep. 16, 1999.

BACKGROUND OF THE INVENTION

1. Field of the Invention

This invention relates to a system and method for realizing smooth communication of information between an information apparatus such as a navigation system and users.

2. Related Art

Many recent on-vehicle navigation systems are provided with a sophisticated user interface. A user interface is essentially necessary for smooth information output from a system to a user and information input from a user to a system. The information output includes output of speech such as synthesized speech in addition to display by use of a display. The information input includes input of speech based on a speech recognition technique in addition to a switch operation.

Navigation systems provided with a user interface that is switchable between output formats of information as desired by a user have been proposed and realized. For example, the navigation system disclosed in JP-A-8-193837 is switchable between languages (Japanese language, English language, and French language) and dialects (Osaka dialect, Nagoya dialect, and Tohoku dialect). Thereby, a Japanese language user can use information output by means of Japanese language, and Osaka local people can use information output by means of Osaka dialect. Thus, suitable information output corresponding to a user has been realized.

However, in the case of the conventional navigation system, it is required for a user to display a menu screen and to select a desired menu item on display on the menu screen when the information output type is to be switched. As a result, the output format cannot be switched unless the user has previously learned how to switch the information output format. Furthermore, even if the English menu is displayed in response to a selection of the English language, the user can switch from the English menu to the Japanese menu or German menu as desired by the user only if the user can understand the English menu.

Alternatively, the output mode can be switched by the use of a speech command. This case requires that the user remember in advance a fixed speech command for switching. In a system in which the output mode is switched to "Osaka dialect" by means of the speech command "set switching to Osaka language", the output mode cannot be switched with a speech input that is not exactly the same speech as "Osaka language" such as "I want to switch to Osaka language" or "set to Osaka language".

SUMMARY OF THE INVENTION

The present invention solves the above-mentioned problems. It is an object of the present invention to realize an automatic switching operation to an information output format that is acceptable to a user that wants to switch between pluralities of information output formats.

The present invention comprises an information processing system with a speech input unit, a memory unit, an information output unit, and a control unit. The control unit is programmed to drive the information output unit to issue an inquiry which requests an input of speech from a user, determine the type of speech inputted by the user with reference to a plurality of types of speech stored in the memory unit, set an output mode of information for the information output unit in correspondence with the determined type of speech input, and drive the information output unit to issue information in the set output mode.

Preferably, the inquiry and the information are displayed on a display panel of the information output unit. The pluralities of types of speech are different languages, and the setting step sets the output mode of the information output unit to the same language as the speech inputted by the user.

BRIEF DESCRIPTION OF THE DRAWINGS

The above and other objects of the present invention will become more apparent from the following detailed description made with reference to the accompanying drawings.

DETAILED DESCRIPTION OF THE PREFERRED EMBODIMENT

The present invention will be described in more detail with respect to several embodiments, in which the same or like parts are designated by the same or like reference numerals.

[First Embodiment]

Figure 1:
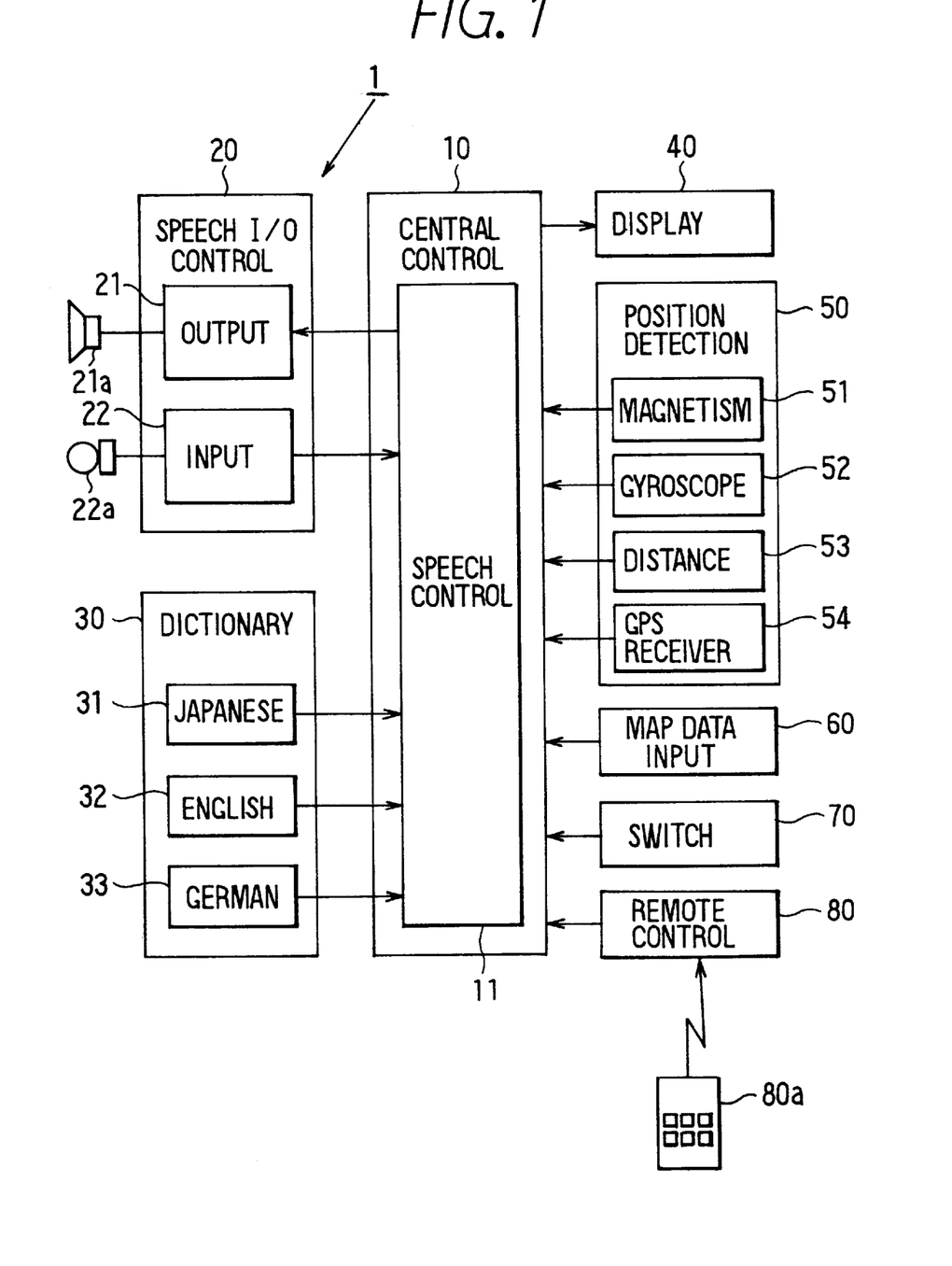
FIG. 1 is a block diagram illustrating a navigation system according to the first and second embodiments of the present invention.

Referring to FIG. 1, a navigation system 1 comprises a central control unit 10 provided with a speech input/output control unit 20, a speech dictionary memory 30, a display unit 40, a position detection unit 50, a map data input unit 60, an operation switch group 70, and a remote control sensor 80 that are all connected to the control unit 10. The control unit 10 is provided with a CPU, ROM, RAM, I/O, and bus line for connecting these components. The control unit 10 is provided with a speech control unit 11 for controlling the speech.

The speech input/output control unit 20 is connected to the speech control unit 11, and is provided with a speech output control unit 21 and a speech input control unit 22. A speaker 21a is connected to the speech output control unit 21, and the speech is generated from the speaker 21a by way of the speech output control unit 21 based on instructions supplied from the speech control unit 11. The speech output control unit 21 comprising an amplifier or the like amplifies and sends out the speech signal. The speech may be a synthesized speech or a natural speech stored in the speech dictionary memory 30. The speech input control unit 22 comprises a filter circuit or the like and is connected to a microphone 22a. The speech input control unit 22 removes noise having frequencies other than that of the input speech supplied by the user from the microphone 22a, and then supplies it to the speech control unit 11.

A dictionary that stores words used for speech recognition is stored in the speech dictionary memory 30. In FIG. 1, a Japanese language dictionary 31, an English dictionary 32, and a German dictionary 33 store recognition target words for speech recognition. The recognition target word for speech recognition includes the speech command for operating the navigation system 1. Words stored in these dictionaries 31 to 33 correspond to the speech division specification word for language set processing.

The display unit 40 has a color display panel that uses a LCD or the like. The information is displayed to a user by means of the display unit 40.

The position detection unit 50 is provided with a terrestrial magnetism sensor 51, a gyroscope 52, a distance sensor 53, and a GPS receiver 54 for GPS (Global Positioning System) that detects the position of a vehicle based on electromagnetic wave signals from satellites.

Because these sensors 51, 52, 53, and 54 involve some errors that are different in nature, the position detection unit 50 is structured so that a plurality of these sensors complement each other in use. The position detection unit 50 may be structured differently by using only some of these components depending on their accuracy. The position detection unit 50 may also include a rotation sensor of a steering, a wheel sensor or the like.

The map data input unit 60 is an apparatus for supplying various data including map matching data, map data, or the like for improving the accuracy of position detection. Usually a CD-ROM is used as a memory medium, but another medium such as a DVD, memory card, or the like maybe used as the memory medium.

The operation switch group 70 comprises touch switches, mechanical switches, or the like that are incorporated in the display unit 40, and used for various inputs.

The remote sensor 80 acquires the operation information of a user by way of a remote control terminal (remote controller) 80a. The control unit 10, display unit 40, position detection unit 50, map data input unit 60, operation switch group 70, and the remote control sensor 80 constitute a navigation apparatus together.

On the screen of the display unit 40, a vehicle present location mark supplied from the position detection unit 50, the map data supplied from the map data input unit 60, and additional data such as guidance route, names, and marks displayed on the map are displayed together. In this navigation system 1, when a location of the travel destination and specific route (specification of the place to be passed) such as expressways or the like as required are entered from the remote control sensor 80 by means of the remote controller 80a, from the operation switch group 70, or from the speech input control unit 22 by means of the microphone 22a, an optimal route from the present location to the location of destination is automatically selected, and the guidance route is formed and displayed. As one of the methods for setting the optimal route automatically, the Dijkstra method has been known. After the guidance route is formed and displayed, speech for guiding the route is generated from the speaker 21a by way of the speech output control unit 21 depending on the running location of the vehicle.

In addition to the route guiding function described above, the navigation system 1 of the present embodiment is selectively switchable of the language used for information output processing between Japanese language, English language, and German language. The term "information output processing" means the information displaying on the display unit 40 and the speech generation from the speaker 21a. In the case that the language is switched to Japanese language, Japanese language is used for not only names or objects displayed on the screen of the display unit 40 but also the menu display used for the route guiding function, and the speech generated for guiding the route.

The navigation system of the present embodiment provides a system in which the language to be used is easily switchable corresponding to the need of a user.

Figure 2:
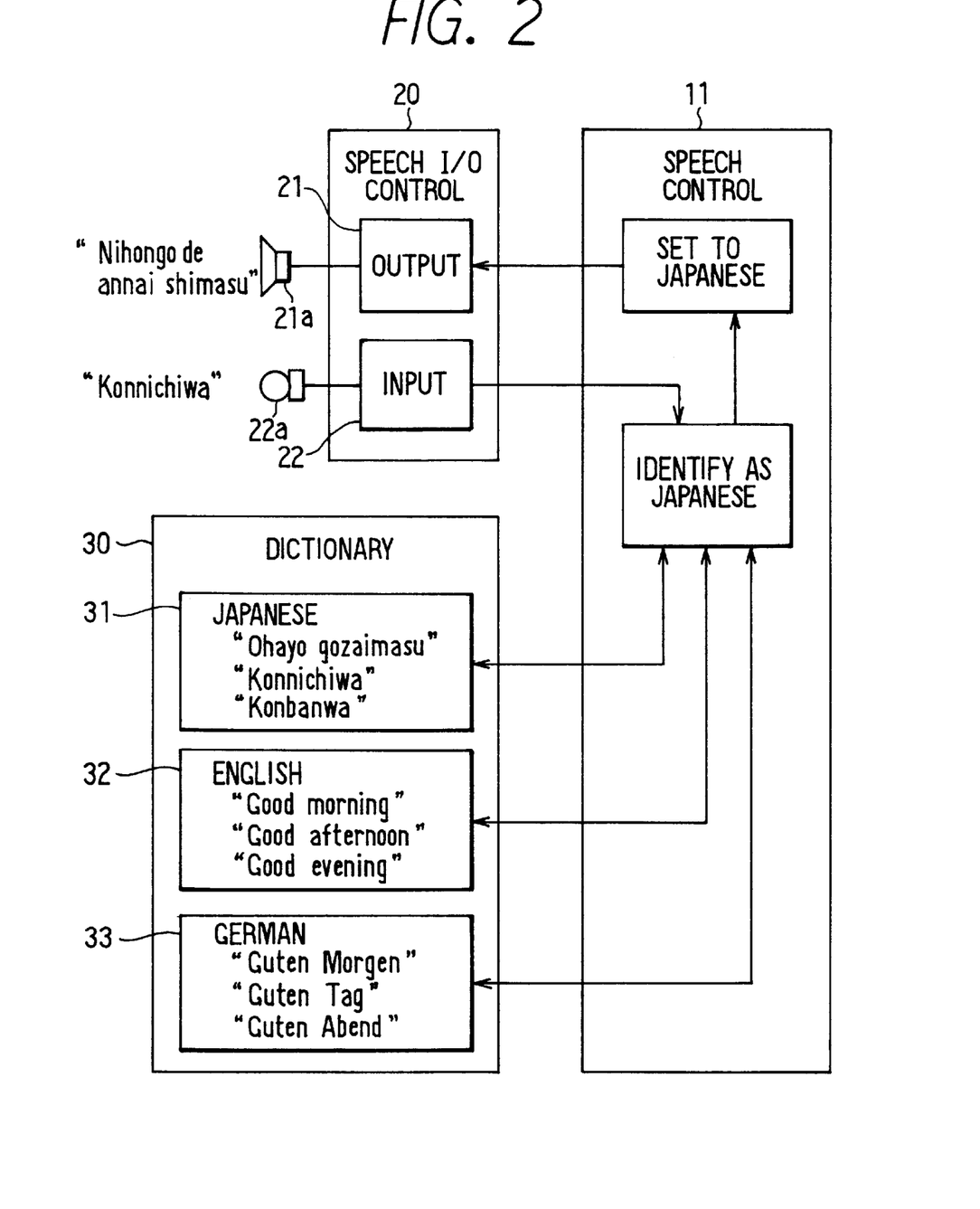
FIG. 2 is a block diagram illustrating a speech control portion of the system shown in FIG. 1.

The language to be used is switched as shown in FIG. 2, which illustrates only the portion that relates to the speech control out of the whole structure shown in FIG. 1. For easy understanding of the correlative relation to FIG. 1, the same characters numbers of FIG. 1 are used.

In the present embodiment, the speech division is set in advance, to the input speech of a user, supplied from the microphone 22a by way of the speech input control unit 22. The language is switched to the language to be used for information input/output based on the specified speech division.

The speech division is the division by language (language division). To determine the speech division (language division) to which the input speech belongs, the speech division specification has words corresponding to respective speech divisions (language division) that are stored in advance. The speech division specification words are stored in the speech dictionary memory 30. As shown in FIG. 2, in the Japanese language dictionary 31 of the speech dictionary memory 30, words such as "Ohayogozaimasu", "Konnichiwa", and "Konbanwa" are stored as the speech division specification word. In the English language dictionary 32 of the speech dictionary memory 30 words "Good morning", "Good afternoon", and "Good evening" are stored as the speech division word. In the German language dictionary 33 of the speech dictionary memory 30 "Guten Morgen", Guten Tag", and "Guten Abend" are stored as the speech division word. There are more words corresponding to speech commands for operating the navigation system 1 included in the respective dictionaries 31 to 33 as described above, although not shown in FIG. 2.

The speech control unit 11 compares an input speech of a user supplied from the microphone 22a by way of the speech input control unit 22 with a word stored in the dictionaries 31 to 33 of the speech dictionary memory 30 to determine the similarities. For example, when the input speech is "Konnichiwa" as shown in FIG. 2, the language is identified as Japanese because the input speech is identified to be identical with the word "Konnichiwa" stored in the Japanese language dictionary 31. In this case, the language to be used for information input/output is set to Japanese language. As a result, the speech control unit 11 generates a Japanese speech "Nihongo de annai shimasu" from the speaker 21a. After that time, Japanese language is used for all the speech generated from the speech output control unit 21 by way of the speaker 21a. The speech for route guiding, and display on the display unit 40 are shown in FIG. 1.

Figure 3:
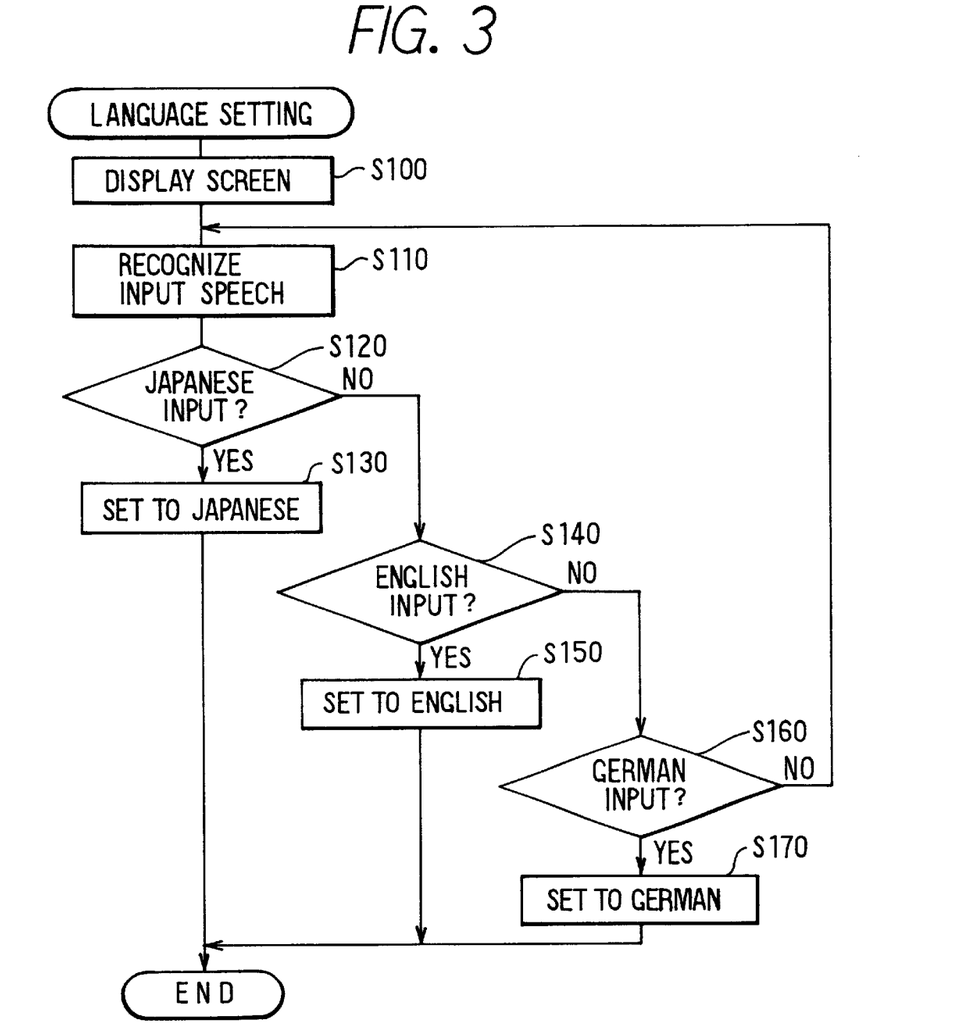
FIG. 3 is a flow chart illustrating a language setting routine of the first embodiment.

Next, the language setting routine using the language switching method will be described based on the flow chart of FIG.3. The language setting routine shown in FIG. 3 is implemented by the speech control unit 11, and implemented automatically when the power source is applied to the navigation system 1. In the case of an on-vehicle navigation system, when an engine of the vehicle is started or when an accessory is turned on (ACC ON), the language setting routine is implemented. Otherwise, the language setting routine may be implemented with a predetermined time interval such as 2 hours, or maybe implemented when a user operate a switch.

Figure 4:
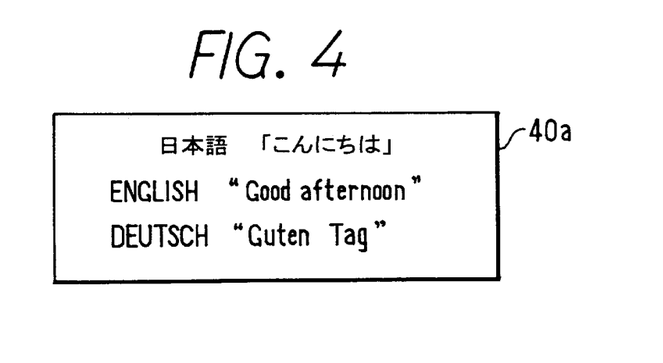
FIG. 4 is an example screen displayed during the language setting routine of the first embodiment.

At first step S100, an initial screen is displayed on the display unit 40. This step is a step for requesting or prompting a user to enter a speech input. In detail, the initial screen as exemplified in FIG. 4 is displayed. The Japanese language "Konnichiwa", the English language "Good afternoon", and the German language "Guten Tag" are displayed on a display panel 40a of the display unit 40 as shown in FIG. 4 to prompt the user to speak any one of these words. Although a simple expression that is easy for the user to read is used in FIG. 4, other expressions such as "Nihongo de 'Konnichiwa' to ohanasi kudasai" may be used.

At subsequent step S110, speech input and speech recognition are performed. A speech from a user is taken in from the speech input control unit 22 by way of the microphone 22a. The input speech is then taken in from the speech input control unit 22 and compared with the words stored in the dictionaries 31 to 33 of the speech dictionary memory 30 to determine the similarities.

Based on the speech recognition result, whether the input speech is Japanese language input or not is determined at the next step S120. If the input speech is identical with the word stored in the Japanese language dictionary 31, a YES result is output. If the input speech is determined to be a Japanese language input (S120: YES), then Japanese language is set at S130, and the language setting routine is brought to an end. If the input speech is determined to not be Japanese input (S120: NO), then the sequence proceeds to S140.

At S140, it is determined whether the input speech is an English language input or not based on the speech recognition result at step S110. If the input speech is determined to be identical with a word stored in the English dictionary 32, then a YES result is output. If the input speech is determined to be an English language input (S140: YES), then English language is set at S150, and the language setting routine is brought to an end. If the input speech is determined to not be an English language input (S140: NO), then the sequence proceeds to S160.

At S160, it is determined whether the input speech is a German language input or not based on the speech recognition result at S110. If the input speech is identical with a word stored in the German dictionary 33, then a YES result is output. If the input speech is determined to be a German language input (S160: YES), then German language is set at S170, and the language setting routine is bought to an end. If the input speech is determined to not be German language input (S160: NO), then the sequence repeats the steps from S110.

If a specific language cannot be set after repetition of the routine from S110 to S160 a predetermined amount of times (for example, three times), the language setting routine is terminated, and the language that has been set before the routine is implemented is used for information output. In that case the manual language setting in which a menu is displayed on the screen for selection of a language by a user may follow the language setting routine.

According to the navigation system 1 of the present embodiment, the input speech itself is not used as a command but rather as a manner of determining whether an input speech is a Japanese language input (S120 in FIG. 3), an English language input (S140), or a German language input (S160). Based on the unspecified input speech, and corresponding to the determination result, the language used for information output on the display unit 40 is switched (S130, S150, and S170). Therefore, the switching to the language acceptable for a user is automatically realized without the user having to remember a specific speech command.

In the present embodiment, the initial screen for prompting a user to enter a speech input is displayed on the display (S100 in FIG. 3). The navigation system prompts a user to speak a speech division specification word stored in the dictionaries 31 to 33. As a result, the input speech of a user is limited to a select group of words, and is easily identified. Because there are only a limited number of words stored in the dictionaries 31 to 33, the language is switched correctly at a high probability.

If a user speaks a speech command for operating the navigation system 1 that is not on the screen display at step S100, as long as the speech command is a spoken word in the dictionaries 31 to 33, the correct speech division (language division) is specified, and the language is switched.

[Second Embodiment]

The second embodiment is different from the first embodiment in the language setting routine shown in FIG. 3. The language setting routine in the present embodiment is shown in a flow chart of FIG. 5. The language setting routine is also implemented by the speech control unit 11, and implemented automatically when a power source is applied to the navigation system. In the case of an on-vehicle navigation system, the language setting routine is implemented automatically when the engine of the vehicle is started or when the accessory is turned on (ACC ON). Otherwise the language setting routine may be implemented with predetermined time interval such as 2 hours, or may be implemented by means of switch operation by a user.

Figure 5:
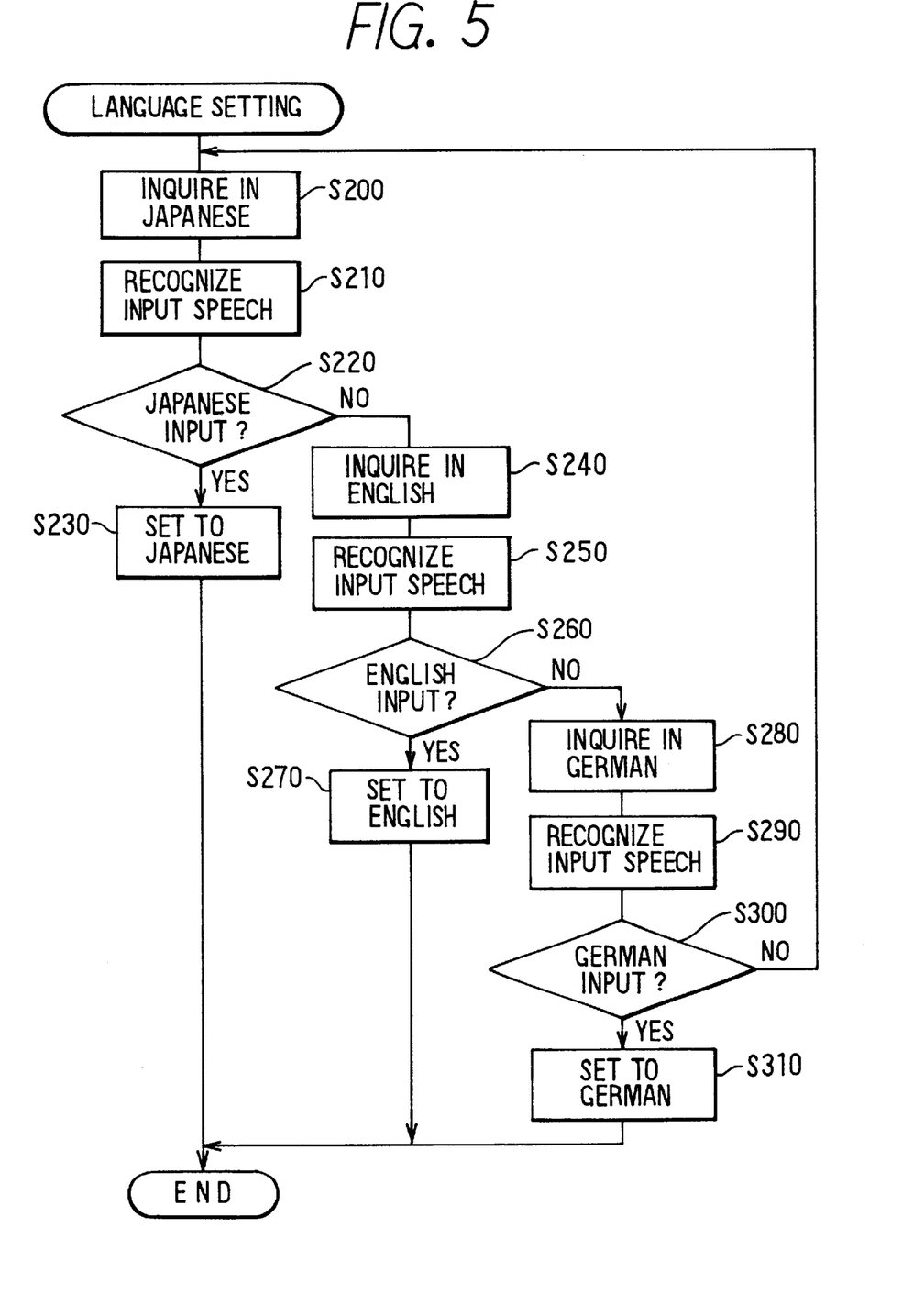
FIG. 5 is a flow chart illustrating the language setting routine of the second embodiment.

At first, an inquiry is made in Japanese language at step S200. In this processing, the speech output control unit 21 is instructed to generate a speech output by way of the speaker 21a for prompting a user to enter a speech input. In detail, a speech "Ohayogozaimasu", if it is in the morning, "Konnichiwa", if it is in the afternoon, or "Konbanwa", if it is in the evening, is generated.

Subsequently, the speech input and speech recognition are performed at S210. This processing is the same as that of S100 shown in FIG. 3 described in the first embodiment. The input speech is taken in, and it is determined whether the input speech is identical with a word stored in the dictionaries 31 to 33 of the speech dictionary memory 30 or not. The user will likely speak "Ohayogozaimasu", "Konnichiwa", or "Konbanwa" in response to the inquiry at step S200. The input speech of the user can then be recognized.

At next step S220, it is determined whether the input speech is a Japanese language input or not based on the speech recognition result. If the input speech is identical with the word stored in the Japanese language dictionary 31, then a YES result is output. If the input speech is determined to be a Japanese language input (S220: YES), then Japanese language is set at step S230, and the language setting routine is brought to an end. If the input speech is determined to not be a Japanese language input (S220: NO), then the sequence proceeds to S240.

An inquiry is made in English language at step S240. In this processing, the speech output control unit 21 is instructed to generate a speech output by way of the speaker 21a for prompting a user to enter a speech input as at S200. In detail, a speech "Good morning", if it is in the morning, "Good afternoon", if it is in the afternoon, or "Good evening", if it is in the evening, is generated.

In the subsequent S250, the speech input and speech recognition are performed. As at S210, the input speech is taken in, and the input speech is compared with words stored in the dictionaries 31 to 33 of the speech dictionary memory 30 to determine the coincidence. The input speech of the user generated is in response to the inquiry at S240 is recognized.

At step S260, whether the input speech is an English language input or not is determined based on the speech recognition result. If the input speech is identical with a word stored in the English language dictionary 32, then a YES result is output. If the input speech is determined to be an English language input (S260: YES), then English language is set at step S270, and the language setting routine is ended. If the input speech is determined to not be an English language input (S260: NO), then the sequence proceeds to S280.

An inquiry is made in German language at step S280. In this processing, the speech output control unit 21 is instructed to generate a speech output by way of the speaker 21a for prompting a user to enter a speech input as at steps S200 and S240. In detail, a speech "Guten Morgen", if it is in the morning, "Guten Tag", if it is in the afternoon, or "Guten Abend", if it is in the evening, is generated.

At subsequent S290, the speech input and speech recognition are performed. As at S210 and S250, the input speech is taken in, and the input speech is compared with words stored in the dictionaries 31 to 33 of the speech dictionary memory 30 to check the similarities. The input speech of the user generated in response to the inquiry at S280 is recognized.

At next step S300, whether the input speech is a German language input or not is determined based on the speech recognition result. If the input speech is identical with a word stored in the German language dictionary 32, then a YES result is output. If the input speech is determined to be a German language input (S300: YES), then German language is set at step S310, and the language setting routine is brought to an end. If the input speech is determined to not be a German language input (S300: NO), then the sequence repeats the steps from S200.

If a specific language cannot be set after the routine from S200 to S300 is repeated a predetermined number of times (for example, three times), the language setting routine is terminated, and the language that has been set before the routine is implemented is used for information output. In that case, the manual language setting in which a menu is displayed on the screen for selection of a language may follow the language setting routine.

In this embodiment, even if a user does not remember a specific speech command, switching to the language acceptable for the user is easily facilitated. A phonic inquiry of a user (S200, S240, and S280 in FIG. 5) prompts the user to speak a speech division specification word stored in the dictionaries 31 to 33. The input speech of the user is identified with a high probability of success because there are only a select number of words in the dictionaries 31 to 33. A speech division (language division) is specified when a user speaks a speech command, and the language is switched in the same manner as described hereinbefore.

In the case that a user cannot understand the language of the phonic inquiry in the present embodiment, the user can be silent. A user can return a response (for example, "Ossu" or "Un" in Japanese) upon hearing an understandable language. Therefore, the language is set to correspond to the response word of the user to the phonic inquiry, and that language is used for information output by the system. In this case, these response words must be stored in advance in the speech dictionary memory 30.

[Third Embodiment]

Figure 6:
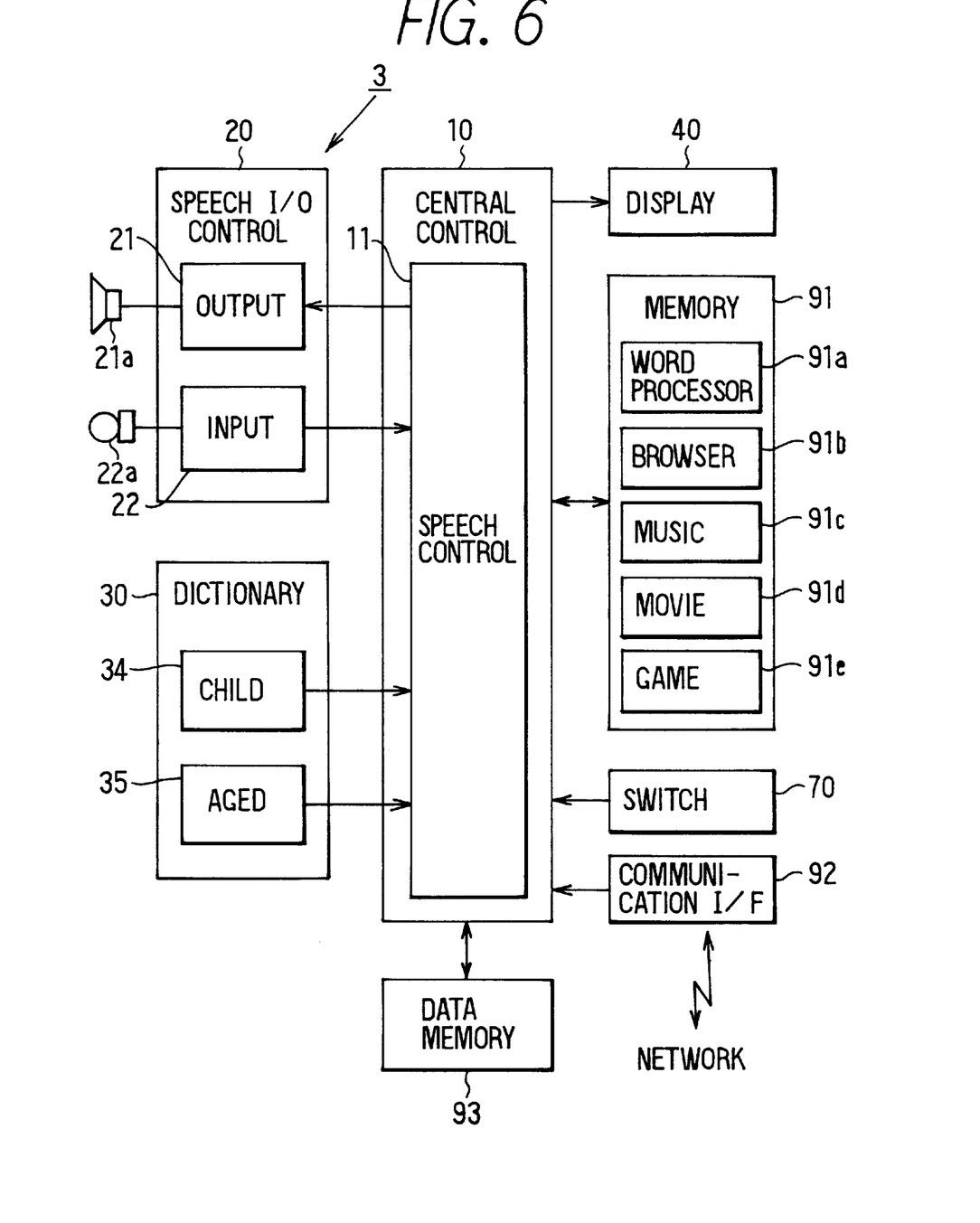
FIG. 6 is a block diagram illustrating a portable information terminal unit according to a third embodiment of the present invention.

A third embodiment shows an example in which the present invention is applied to a portable information terminal unit 3 shown in FIG. 6.

The portable information terminal unit 3 comprises the central control unit 10, the speech input/output control unit 20 connected to the control unit 10, the speech dictionary memory 30, the display unit 40, the operation switch 70, a memory unit 91, a communication interface (communication I/F) 92, and a data memory unit 93.

The structure of the control unit 10, the speech input/output control unit 20, the display unit 40, and the operation switch group 70 is the same as that of the first and second embodiments.

The portable information terminal unit 3 is provided with the speech dictionary memory 30 like the first and second embodiments. The speech dictionary memory 30 is different from the above embodiments in that it includes a child dictionary 34 and an elderly person dictionary 35. In these dictionaries 34 and 35, speech division specification words are stored for output mode set processing.

The memory unit 91 comprises a memory unit such as a hard disc, and stores various application software. In the present embodiment, word processor software 91a, net browser 91b, music playback software 91c, movie playback software 91d, and game software 91e are stored as the application software.

The communication I/F 92 is an interface for connecting to cellular phones (not shown). The net browser 91b is used for connecting to the Internet by use of the communication I/F 92. A user can communicate e-mail and surf the net by use of the net browser 91b. The music playback software 91c and the movie playback software 91d are used for the operation in which the portable information terminal unit 3 is connected to a predetermined center by way of the communication I/F 92. The music data or video data desired by the user is acquired, and the acquired music data or movie data is played back or reproduced. The music is generated from the speech output control unit 21 by way of the speaker 21a. The image is displayed on the display unit 40. A user can enjoy a game with an unfamiliar person through communication by way of the communication I/F 92 using the game software 91e. The application software is expanded on the RAM of the control unit 10 and executed by the CPU of the control unit 10 to realize the above operations.

The data memory unit 93 is a large capacity memory device for storing the music data and movie data to be played back by use of the music playback software 91c and movie playback software 91d.

The portable information terminal unit 3 is structured so that a user can receive information service as desired according to the menu displayed on the display unit 40.

Figure 7:
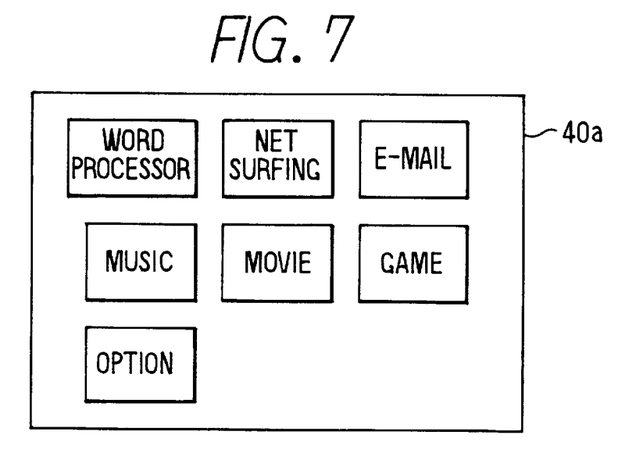
FIG. 7 is an explanatory diagram illustrating a top menu display screen of the portable information terminal unit shown in FIG. 6.

FIG. 7 shows a top menu displayed on the display unit 40. In the case of this portable information terminal unit 3, a total of seven icons such as "word processor", "net surfing", "e-mail", "music", "movie", "game", and "option" are displayed as shown in FIG. 7. When a user touches an icon on the screen with a finger, the menu selection information is supplied to the control unit by way of the operation switch group 70 that is combined with the displayed unit 40. Therefore, an application corresponding to the icon is read out from the memory unit 91 to the control unit 10 and executed. If "option" icon is selected, a system menu for customizing various functions of the portable information terminal unit 3 is activated.

The icons displayed on the top menu can be switched depending on the age of the user in the case of this portable information terminal unit 3.

Next, a method for switching the top menu mode will be described herein under.

In the present embodiment, the speech division is set in advance, also the speech division to which the input speech of a user entered from the speech input control unit 22*a* by way of the microphone 22*a* is specified, and the top menu display mode is switched as in the case of the first and second embodiments.

In the present embodiment, the speech division herein addressed is assumed to be the division by age (age division). To determine the speech division (age division) to which an input speech belongs, speech division specification words corresponding respective speech divisions (age division) have been stored in advance. The speech dictionary memory 30 stores the speech division specification words. The age division includes three divisions, adult division, child division, and elderly people division in the present embodiment. In the child dictionary 34 of the speech dictionary memory 30, speech division specification words corresponding to the child division are stored. These words may be words that are familiar only to children, for example, names of heroines and heroes in television programs that are familiar to children. In the elderly person dictionary 35 of the speech dictionary memory 30, speech division specification words corresponding to the elderly person division are stored. These words may be words that are familiar only to elderly persons, such as names of people that are familiar only to elderly persons.

The speech control unit 11 compares an input speech of a user supplied from the speech input control unit 22 by way of the microphone 22*a* with a word stored in the dictionaries 34 and 35 of the speech dictionary memory 30 to determine the similarities. If the input speech is identical with a word stored in the child dictionary 34, then the input speech is determined to be a word that belongs to the child division. If the input speech is identical with a word stored in the elderly person dictionary 35, then the input speech is determined to be a word that belongs to the elderly person division. When the speech division (age division) to which the input speech belongs is identified, the speech control unit 11 switches the display mode of the top menu based on the speech division (age division).

Figure 8:
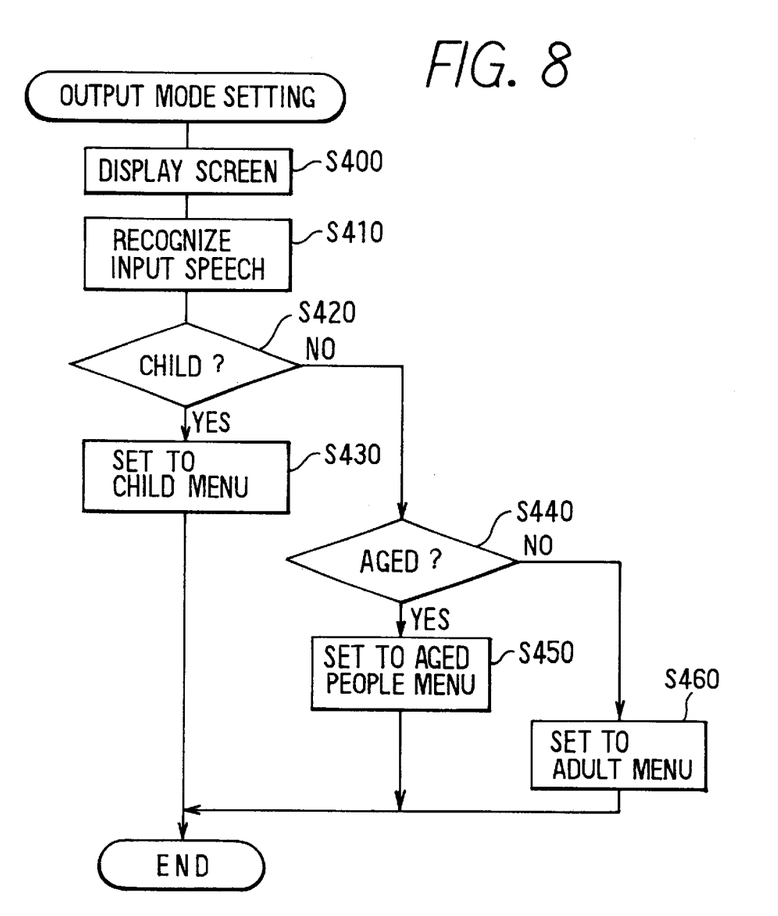
FIG. 8 is a flow chart illustrating an output mode setting routine of the third embodiment.

Next, the output mode setting routine that uses the top menu display mode switching method will be described with reference to a flowchart shown in FIG. 8. The output mode setting routine shown in FIG. 8 is executed by the speech control unit 11, and executed automatically when a power source is applied to the information terminal unit 3 of the present embodiment. The setting routine may be implemented with a predetermined time interval such as 2 hours, or may be implemented by means of switch operation by a user via the operation switch group 70.

Figure 9:
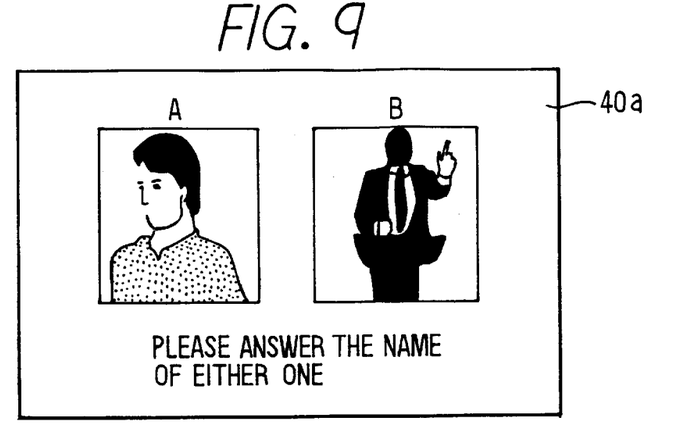
FIG. 9 is an explanatory diagram illustrating a screen displayed during screen display processing in the output mode setting routine.

At first step S400, a screen is displayed on the display unit 40. This processing prompts a user to enter a speech input, and a screen as exemplified in FIG. 9 is displayed on the display panel 40*a*. In detail, a heroine or hero in television programs that are familiar only to children (shown with character A), and a personality that is familiar only to elderly persons (shown with character B) are displayed side by side. "Please answer the name of either one" is displayed. At that time, if the user is a child, the user will likely say the name of the heroine or hero in television programs. On the other hand, if the user is an elderly person, the user will likely say the name of the personality.

At subsequent step S410, the speech input and speech recognition are performed. The input speech from the user is taken in from the speech input control unit 22 by way of the microphone 22*a* as described above. The input speech is compared with words stored in the dictionaries 34 and 35 in the speech dictionary memory 30 to determine the similarities.

Figure 10A:
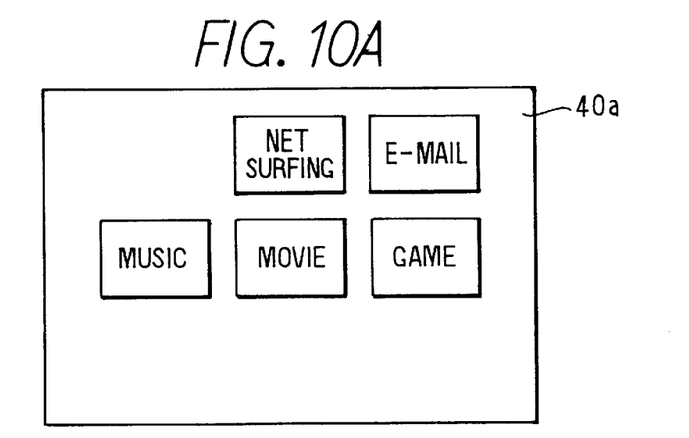
FIGS. 10A and 10B are explanatory diagrams illustrating a switching operation of the top menu display mode.

At next step S420, it is determined whether the user is a child or not based on the speech recognition result. If the input speech is identical with a word stored in the child dictionary 34, then a YES result is output. If the user is determined to be a child (S420: YES), then the child menu is set at S430, and the output format set routine is terminated. In the menu for children, for example, "word processor" icon and "option" icon for customization may not be displayed as shown in FIG. 10A. If the user is determined to be not a child (S420: NO), the sequence proceeds to S440.

Figure 10B:
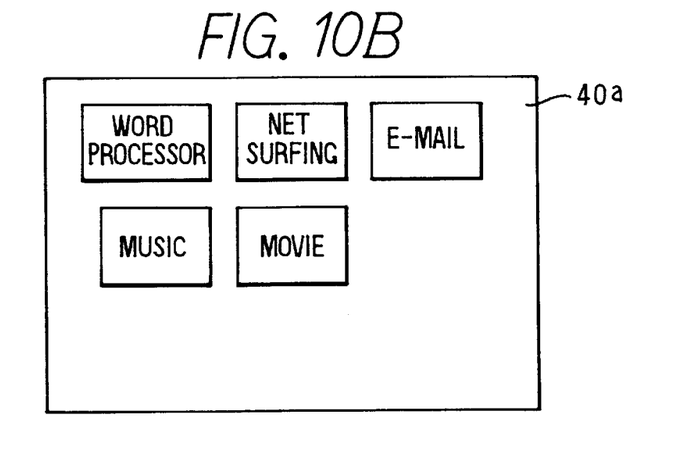

At S440, whether the user is an elderly person or not is determined based on the speech recognition result obtained at S410. If the input speech is identical with a word stored in the elderly person dictionary 35, then a YES result is output. If the user is determined to be an elderly person (S440: YES), then the elderly person menu is set at S450, and then the output mode setting routine is terminated. In the elderly person menu the "game" icon, which would not likely be used, and the "option" icon for customizing details may not be displayed as shown in FIG. 10B. If the user is determined to not be an elderly person (S440: NO), the adult menu is set at S460, and then the output format setting routine is terminated. In the adult menu, for example, all the icons may be displayed as shown in FIG. 7.

To ensure the specification of a child, an elderly person, or an adult, the sequence returns to S400 when a NO determination is output at S440 (S440: NO), the character displays exemplified in FIG. 9 are changed to change the content of the screen display, and then the processing at steps S410 to S440 may be executed. At that time, if the user is not determined to be a child or an elderly person after several repetitions of the processing, then the adult is specified.

Also in the portable information terminal unit 3 of the present embodiment, as in the first and second embodiments, the input speech itself is not used as a command. Whether a user who has spoken a speech is a child (S420 in FIG. 8) or an elderly person (S440) is determined based on the unspecified input speech, and the top menu display mode is then switched (S430, S450, and S460) depending on the determination result. Thereby, switching to the output format that is acceptable for a user is realized easily without remembering a specific speech command.

Also in the present embodiment, the screen display prompts a user to enter a speech input (S400 in FIG. 8). The inquiry of a user by means of the screen display prompts the user to speak a speech division specification word stored in the dictionaries 34 and 35. The input speech of the user is identified with a high probability of success because there are only a limited number of words stored in the dictionaries 34 and 35.

[Other Embodiments]

(a) In the first and second embodiments, the language used for information output is switched to any one of Japanese language, English language, and German language. It may otherwise be switched to other languages including French, Italian, Spanish and the like provided that dictionaries corresponding to respective languages are stored in the speech dictionary memory 30.

The language is not necessarily used for information output processing. Rather, a general word having the wider concept than that of the language may be used. The general word used herein may be defined as the symbol system for expressing and transmitting the thought, emotion, and intention of people by means of speech or character. Further, the diagram or picture other than the general word may be used for information output. In this case, the information output mode of the information output processing can be also switched.

(b) Although a user is prompted to speak a word that is used usually for greeting such as "Konnichiwa" in the language setting routine in the first and second embodiments (S100 in FIG. 3, S200, S240, and S280 in FIG. 5), the word is not limited to this word. The inquiry for obtaining an expected response of a user maybe used; a word such as "Genkidesuka" or "Dochiramade ikimasuka" may be displayed or spoken. In this case, a response such as "Genkidesu", "Hai", or "Iie" is expected in response to "Genkidesuka", and a response such as a name of a facility or a name of a local area is expected in response to "Dochiramade ikimasuka". Therefore, the word such as "Gennkidesu", the name of the facility, or the name of the local area is stored in the dictionaries 31 to 33, so that the speech division (language division) can be specified.

(c) The language used for information output is switched in the first and second embodiments, and the general word system used for information output is switched as described in the above modification (b). In the latter case, a dictionary that stores the standard language or dialect may be stored in the speech dictionary memory 30. For example, for switching between Osaka dialect, Nagoya dialect, and Tohoku dialect, a dictionary that stores Osaka dialect words, a dictionary that stores Nagoya dialect words, and a dictionary that stores Tohoku dialect words are stored.

As described in the above modification (c), the speech of the unit side may be switched between male speech and female speech. In this case, a dictionary that stores words that only a man will expectably use, and a dictionary that stores words that only a woman will expectably use may be stored in the speech dictionary memory 30.

Furthermore, as described in the third embodiment, the output format of the information may be switched depending on the age of a user.

(d) In the first and second embodiments, the word corresponding to the speech command for operating the navigation system 1 is stored as the recognition target word in the dictionaries 31 to 33 in the speech dictionary memory 30. The input speech is subjected to speech recognition, and the information input is realized by means of the speech entered by a user.

The word corresponding to the speech command for operating the navigation system 1 may be stored in the dictionaries 31 to 33 as described above. In some cases, however, the number of recognition target words to be stored in the speech dictionary memory 30 is limited depending on the capacity of the system. To avoid such a problem, the dictionary to be stored in the speech dictionary memory 30 may be changed depending on switching of the language or the like to be used. For example, in the case that the language is switched to Japanese language, because a user likely enters the Japanese language information input to the navigation system 1, the Japanese language dictionary is set to the speech dictionary memory 30. Thus, the dictionary that is acceptable for the user is stored in the speech dictionary memory 30, and the smooth information input by means of speech is realized.

The present invention may be implemented in many other ways without departing from the spirit of the invention.

What is claimed is:

1. An information processing system for communication of information with a user comprising:

information output means for outputting information;

speech input means for entering speech of a user;

memory means for storing speech division specification words;

speech division specification means for determining a similarity between the input speech supplied by way of the speech input means and a speech division specification word in the memory means, and for specifying a speech division to which the input speech belongs; and switching means for switching an information output format of the information output means in an information output processing based on the speech division specified by the speech division specification means.

2. The system as in claim 1, wherein:

a language is switched as the information output format in the case that the language is to be used in the information output processing;

a language division that is a division of the language to be used by the user is included in the speech division; and the switching means switches the language to be used in the information output processing based on the language division specified by the speech division specification means.

3. The system as in claim 1, wherein:

a general word system is switched as the information output format in the case that the language has a plurality of general words system comprising a standard language and dialects, when the language is used in the information output processing;

the speech division includes a dialect division that is a division according to the general word system used by the user; and the switching means switches the general word system to be used in the information output processing based on the dialect division specified by the speech division specification means.

4. The system as in claim 1, wherein:

a speech used in the information output processing is switchable between male speech and female speech as the information output format;

a sex division that is a division by sex of a user is included in the speech division; and the switching means switches the apparatus side speech to female speech if the sex division specified by the speech division specification means is the female division, and the switching means switches the apparatus side speech to male speech if the sex division is the male division.

5. The system as in claim 1, wherein:

formats corresponding to age of a user are incorporated as the information output format;

the speech division includes the age division that is the division by age of a user; and the switching means switches the information output format to a format acceptable for the user based on the age division specified by the speech division specification means.

6. The system as in claim 1, wherein:

the speech division specification means includes speech recognition means for realizing information input by means of speech from a user and for speech recognition by use of a recognition target word; and the switching means includes recognition target word changing means for changing the recognition target word used for speech recognition by the speech recognition means corresponding to the information output format switched by the switching means.

7. The system as in claim 1, wherein:

the speech division specification means includes inquiry means for executing inquiry processing to prompt a user to speak the speech division specification word.

8. The system as in claim 7, wherein:

the inquiry processing of the inquiry means is a display processing by way of the display means.

9. The system as in claim 7, wherein:

the inquiry processing of the inquiry means is a speaking processing by means of speech.

10. The system as in claim 1, wherein:

the system is constructed as at least one of a navigation apparatus and a portable information terminal unit.

11. The system as in claim 1, wherein:

the speech division specification means repeats determining the similarities a plurality of times, and maintains an original output format when no similarities are determined after the plurality of times.

12. The system as in claim 6, wherein:

the memory means store a plurality of language dictionaries which include the recognition target words in different languages.

13. The system as in claim 12, wherein:

the speech division specification means uses one of stored language words as the recognition target word.

14. A method for controlling an information processing system having a speech input unit, a memory unit and an information output unit, the method comprising the steps of:

driving the information output unit to issue an inquiry which requests an input of speech to a user;

determining a type of the speech input by the user with reference to a plurality of types of speech stored in the memory unit;

setting an output format of information from the information output unit in correspondence with the determined type of speech input; and driving the information output unit to issue information in the set output format.

15. The method as in claim 14, wherein:

the driving steps includes steps of displaying the inquiry and the information on a display panel of the information output unit, respectively.

16. The method as in claim 14, wherein:

the plurality of types of speech are different languages; and the setting step sets the output format of the information output unit to a same language as a language of the speech input by the user.

* * * * *